UNITED STATES PATENT OFFICE.

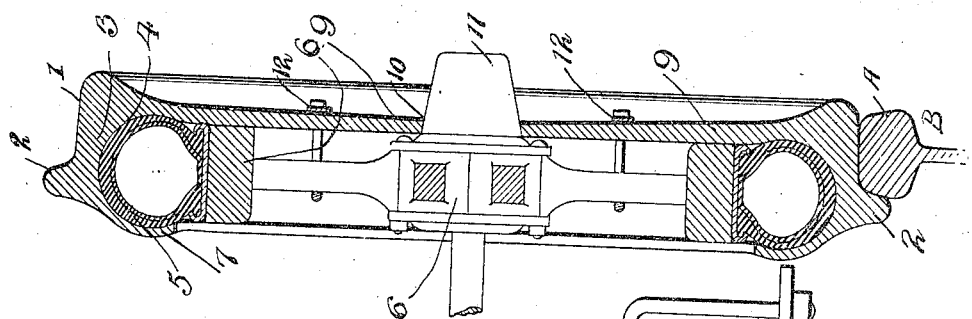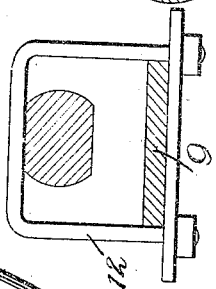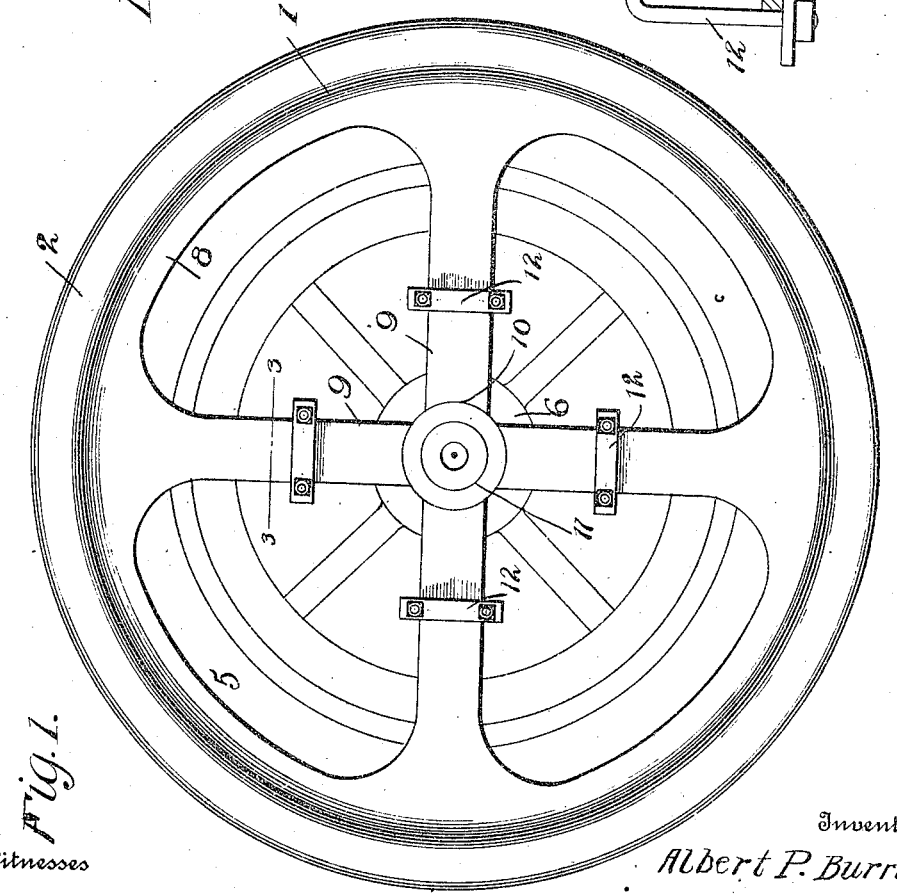

ALBERT P. BURRUS, OF PRESCOTT, ARKANSAS.

VEHICLE-TIRE.

989,332.  Specification of Letters Patent.  Patented Apr. 11, 1911.

Application filed September 7, 1910. Serial No. 580,847.

*To all whom it may concern:*

Be it known that I, ALBERT P. BURRUS, a citizen of the United States of America, residing at Prescott, in the county of Nevada and State of Arkansas, have invented new and useful Improvements in Vehicle-Tires, of which the following is a specification.

This invention relates to vehicle tires and particularly to one designed for use in connection with the well known form of pneumatic tire for automobiles, the object of the invention being to provide a novel form of tire which is constructed for the interchangeable engagement with the wheels of the automobile and which is designed to permit the operator of the vehicle to propel the same along a railroad track structure.

In the drawing, forming a portion of this specification and in which like numerals of reference indicate similar parts in the several views:—Figure 1 is a side elevation of my improved tire. Fig. 2 is a detail vertical section therethrough showing its application to the tire of an automobile wheel. Fig. 3 is a detail transverse section taken on the line 3—3 of Fig. 2.

The tire is constructed preferably of malleable iron or the like and formed to provide a continuous annular tread surface 1 which conforms in configuration with the tread surface of the ball A of the rail B. This surface 1 has formed thereon at one side an annular guard flange 2 which extends downwardly at one side of the rail as clearly shown in Fig. 2 of the drawing. The body member 3 is formed to provide an annular tire-receiving concavity 4 to receive the tire 5 of the wheel 6. The concavity is defined by the inwardly extending guard flange 7 and a similar guard flange 8. From the flange 8 extend the spokes 9 whose inner ends are spaced from each other to form an opening 10 for the reception of the hub 11 of the wheel. The spokes 9 at their inner ends are curved into the body member 3 so as to be disposed immediately above the ball portion A of the rail B.

In practice, the pneumatic tire of the vehicle wheel is deflated. My improved tire is then placed over the said pneumatic tire and the tire inflated so as to cause the same to snugly fit the concavity 4. In placing my improved tire on the tire of the vehicle wheel it is desirable to arrange the spokes 9 diametrically opposite certain of the spokes of the vehicle wheel and to operatively connect the spokes of the vehicle wheel with the spokes 9, I provide the U-shaped clamping clips or bolts 12 as particularly shown in Fig. 3 of the drawing.

From the construction of the tire described it will be seen that after one has been associated with the wheel of an automobile, the automobile will be adapted to travel on the rails of a track structure.

I claim:

A supplemental tire for vehicle wheels having pneumatic tires, comprising a member formed to provide an annular concavity for the reception of the pneumatic tire and into which the tire when inflated will be expanded against the walls of such concavity, the said member having a tread flange surface thereon and formed at one side of the said surface to provide an annular guard flange, spokes extending inwardly toward the hub of the wheel and formed to provide a hub-receiving passage, and fastening devices connecting the spokes of the member with the spokes of the wheel.

In testimony whereof I affix my signature in presence of two witnesses.

ALBERT P. BURRUS.

Witnesses:
T. R. WRIGHT,
IRVIN A. BLAKELY.